(12) United States Patent
Chiang et al.

(10) Patent No.: US 6,553,072 B1
(45) Date of Patent: *Apr. 22, 2003

(54) SYSTEM FOR ENCODING AND DECODING LAYERED COMPRESSED VIDEO DATA

(75) Inventors: Tihao Chiang, Plainsboro, NJ (US); Huifang Sun, Cranbury, NJ (US); Joel Walter Zdepski, Mountain View, CA (US)

(73) Assignee: Thomson Licensing S.A., Boulogne Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,192

(22) Filed: Jul. 9, 1997

Related U.S. Application Data

(63) Continuation of application No. 08/572,845, filed on Dec. 14, 1995, now abandoned.
(60) Provisional application No. 60/000,675, filed on Jun. 29, 1995.

(51) Int. Cl.[7] .................................................. H04N 7/12
(52) U.S. Cl. .................................................. 375/240.25
(58) Field of Search ........................ 348/408, 399–405, 348/407, 409, 415, 420, 402; 375/240.25, 240.28; H04N 7/12

(56) References Cited

U.S. PATENT DOCUMENTS

| 4,656,515 A | 4/1987 | Christopher | 358/183 |
| 4,745,474 A | 5/1988 | Schiff | 358/133 |
| 5,144,425 A | 9/1992 | Joseph | 358/133 |

(List continued on next page.)

FOREIGN PATENT DOCUMENTS

| EP | 0 515 143 | 11/1992 |
| EP | 0 598 184 | 5/1994 |
| EP | 0 634 871 | 1/1995 |
| EP | 0 644 695 | 3/1995 |

OTHER PUBLICATIONS

*Adaptive Frame/Field Motion Compensated Video Coding* by Atul Puri et al.—Signal Processing Image Communication, vol. 5, No. 1/02, Feb. 1, 1993, pp. 39–58.
*Requirements for High Quality Video Coding Standards* by Atul Puri et al.—Signal Processing Image Communication, vol. 4, No. 2, Apr. 1, 1992, pp. 141–151.
*Cosmic: A Compatible Scheme for Moving Image Coding* by Atul Puri et al.—Signal Processing Image Communication, vol. 5, No. 1/02, Feb. 1, 1993, pp. 91–103.
*MPEG2 Bildcodierung Fur Das Digitale Fernsehen* by Lameilleure De J et al.—Fernseh und Kinotechnik, vol. 48, No. 3, Mar. 1, 1994, pp. 99/100, 102–104, 106/107 (with English Translation).
*A Migration Path to a Better Digital Television System* by Lim J. S.—SMPTE Journal, vol. 103, No. 1, Jan. 1, 1994, pp. 2–6.

(List continued on next page.)

Primary Examiner—Young Lee
(74) Attorney, Agent, or Firm—Joseph S. Tripoli; Ronald H. Kurdyla; Guy H. Eriksen

(57) ABSTRACT

A dynamically configurable video signal processing system including an encoder and decoder processes data in the form of hierarchical layers. The system partitions data between hierarchical layers and allows variation in the number of layers employed. Data is automatically partitioned into one or more hierarchical layers as a function of one or more parameters selected from available system bandwidth, input data rate, and output signal quality. In addition, the image resolution and corresponding number of pixels per image of the data may be varied as a function of system parameters.

15 Claims, 10 Drawing Sheets

U.S. PATENT DOCUMENTS

| | | | | |
|---|---|---|---|---|
| 5,148,272 A | | 9/1992 | Acampora et al. | 358/133 |
| 5,262,854 A | | 11/1993 | Ng | 358/133 |
| 5,270,813 A | * | 12/1993 | Puri et al. | 348/415 |
| 5,387,940 A | | 2/1995 | Kwok et al. | 348/446 |
| 5,414,469 A | * | 5/1995 | Gonzales et al. | 348/408 |
| 5,444,491 A | | 8/1995 | Lim | 348/441 |
| 5,452,006 A | * | 9/1995 | Auld | 348/390 |
| 5,510,840 A | * | 4/1996 | Yonemitsu et al. | 348/402 |
| 5,635,985 A | * | 6/1997 | Boyce et al. | 348/402 |
| 5,742,343 A | * | 4/1998 | Haskell et al. | 348/415 |

OTHER PUBLICATIONS

*Hierarchical Coding of Digital Television* by Tihao Chiang et al.—I.E.E.E. Communications Magazine, vol. 32, No. 5, May 1, 1994, pp. 38–45.

MPEG Standard (ISO/IEC 13818–2, May 10th, 1994)—Containing Sections 3, 7.7 and 6.2.2.1 and 6.2.2.2.

MPEG Standard (ISO/IEC 13818–1, Jun. 10, 1994)—Containing Sections 2.6.6–2.6.7.

Elements of Information Theory, by T.M. Cover & J.A. Thomas, published by J.Wiley & Sons, 1991, Section 13.3.2.

Grand Alliance HDTV System Specification of Apr. 14, 1994, published by NAB, Chapter 3.

Manipulation and Compositing of MC–DCT Compressed Video, by S. Chang et al. published in IEEE Journal of Selected Area in Communications, Jan. 1995.

*Hierarchical Coding of HDTV* by F. Bosveld et al.—Signal Processing Image Communication, vol. 4, No. 3, Jun. 1, 1992, pp. 195–225.

*Performance Evaluation of Hierarchical Coding Schemes for HDTV* by F. Bosveld et al.—Signal Processing Theories and Applications, vol. 2, Sep. 18, 1990, pp. 801–804.

*MPEG ++ A Robust Compression And Transport System for Digital HDTV* by K. Joseph et al.—Signal Processing Image Communication, vol. 4, No. 4/05, Aug. 1, 1992, pp. 307–323.

* cited by examiner

SYSTEM FOR ENCODING AND DECODING LAYERED COMPRESSED VIDEO DATA

This is a continuation of application Ser. No. 08/572,845, filed Dec. 14, 1995 now abandoned.

This is a non-provisional application of provisional application serial No. 60/000,675 by T. Chiang et al, filed Jun. 29th 1995.

FIELD OF THE INVENTION

This invention is related to the field of digital image signal processing, and more particularly to a system for processing hierarchical video data.

BACKGROUND OF THE INVENTION

An objective in the development of digital video encoding and decoding formats has been to provide a standard that accommodates different video transmission and reception systems. A further objective has been to promote interoperability and backward compatibility between different generations and types of video encoding and decoding equipment. In order to promote such interoperability and compatibility, it is desirable to define encoding and decoding strategies which can accommodate different types of video image scan (e.g. interlaced/progressive), frame rate, picture resolution, frame size, chrominance coding, and transmission bandwidth.

One strategy used to achieve interoperability involves separating video data into one or more levels of a data hierarchy (layers) organized as an ordered set of bitstreams for encoding and transmission. The bitstreams range from a base layer, i.e. a datastream representing the simplest (e.g. lowest resolution) video representation, through successive enhancement layers representing incremental video picture refinements. The video data is reconstructed from the ordered bitstreams by a decoder in a receiver. This strategy permits decoder complexity to be tailored to achieve the desired video picture quality. A decoder may range from the most sophisticated configuration that decodes the full complement of bitstreams, that is all the enhancement layers, to the simplest that decodes only the base layer.

A widely adopted standard that uses such a data hierarchy is the MPEG (Moving Pictures Expert Group) image encoding standard (ISO/IEC 13818-2, May 10th 1994), hereinafter referred to as the "MPEG standard". The MPEG standard details how the base and enhancement layer data may be derived, and how the video data may be reconstructed from the layers by a decoder. It is herein recognized that it is desireable to provide a system that incorporates encoder and decoder architectures for rationally partitioning data between the various layers and for dynamically configuring such a system for this purpose.

SUMMARY OF THE INVENTION

In accordance with the principles of the present invention, dynamically configurable video signal processing systems enable data allocation among hierarchical layers to be varied. The dynamically configurable systems also permit the data to be partitioned between the hierarchical layers as desired, and allow variation in the number of layers employed.

A disclosed digital signal processing system according to the present invention adaptively processes a datastream of image representative input data. A data processor automatically partitions input data into one or more hierarchical layers as a function of one or more parameters selected from available system bandwidth, input data rate, and output signal quality.

Also disclosed is a digital signal processing system for adaptively decoding a datastream of image representative input data partitioned into one or more hierarchical layers. The decoding system derives synchronization and configuration information from the input data and is adaptively configured to decode the number of hierarchical layers of the input data in response to a locally generated Control signal.

In accordance with a feature of the invention, the image resolution and corresponding number of pixels per image is varied as a function of system parameters.

DETAILED DESCRIPTION OF THE DRAWINGS

The MPEG standard refers to the processing of hierarchical ordered bitstream layers in terms of "scalability". One form of MPEG scalability, termed "spatial scalability" permits data in different layers to have different frame sizes, frame rates and chrominance coding. Another form of MPEG scalability, termed "temporal scalability" permits the data in different layers to have different frame rates, but requires identical frame size and chrominance coding. In addition, "temporal scalability" permits an enhancement layer to contain data formed by motion dependent predictions, whereas "spatial scalability" does not. These types of scalability, and a further type termed "SNR scalability", (SNR is Signal to Noise Ratio) are further defined in section 3 of the MPEG standard.

An embodiment of the invention employs MPEG "spatial" and "temporal" scalability in a 2 layer hierarchy (base layer and single enhancement layer). The enhancement layer data accommodates different frame sizes but a single frame rate and a single chrominance coding format. Two exemplary frame sizes correspond to HDTV (High Definition Television) and SDTV (Standard Definition Television) signal formats as proposed by the Grand Alliance HDTV specification in the United States, for example. The HDTV frame size is 1080 lines with 1920 samples per line (giving 1080×1920 pixels per image), and the SDTV frame size is 720 lines with 1280 samples per line (giving 720×1280 pixels per image). Both the HDTV and SDTV signals employ a 30 Hz interlaced frame rate and the same chrominance coding format.

Although the disclosed system is described in the context of such an MPEG compatible, two layer HDTV and SDTV spatially and temporally scalable application, it is exemplary only. The disclosed system may be readily extended by one skilled in the art to more than two layers of video data hierarchy and other video data resolutions (not only 720 and 1080 line resolution). Additionally, the principles of the invention may be applied to other forms of scalability, such as SNR scalability, and also may be used to determine a fixed optimum encoder and decoder architecture. The principles of the invention have particular application in TV coding (HDTV or SDTV), Very Low Bit Rate Coding (e.g. video conferencing) and digital terrestrial broadcasting for optimizing encoder and decoder apparatus for a desired communication bandwidth.

Figure 1:
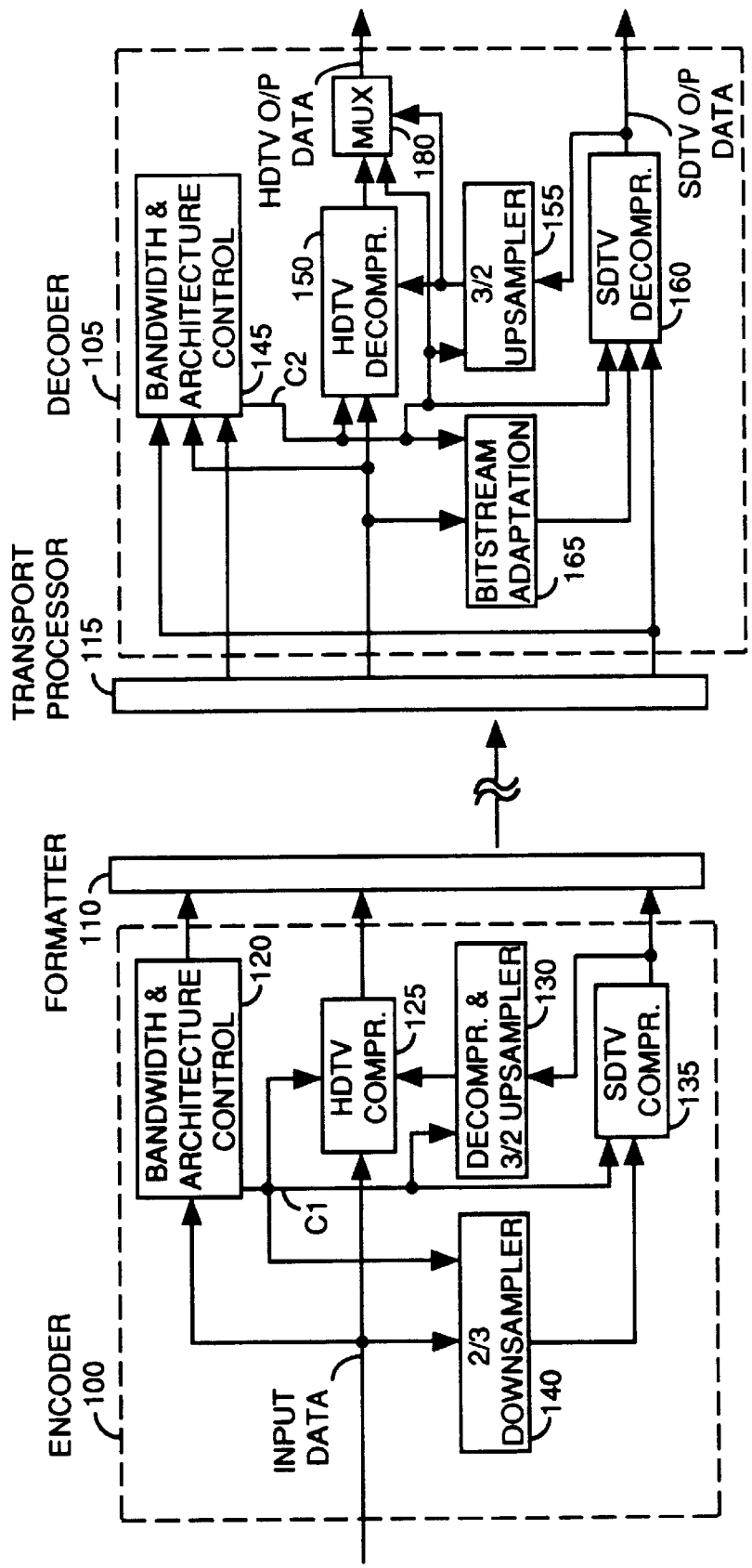
FIG. 1 shows an exemplary dynamically configurable video signal encoding and decoding architecture, according to the invention.

FIG. 1 shows a dynamically configurable video signal encoding and decoding architecture according to the invention. In overview, an input video datastream is compressed and allocated between a base (SDTV) data layer and an enhancement (HDTV) data layer by encoder 100. The allocation is performed in accordance with principles of the invention under the control of bandwidth and architecture control unit 120. The resulting compressed data from encoder 100 in the form of single or dual bitstreams is formed into data packets including identification headers by formatter 10. The formatted data output from unit 110, after transmission over a data channel, is received by transport processor 115. The transmission and reception process is described later in connection with the encoding and decoding system depicted in FIG. 4.

Transport processor 115 (FIG. 1) separates the formatted compressed bitstream data according to layer type, i.e. base or enhancement layer data, based on an analysis of header information. The data output from transport processor 115 is decompressed by decoder 105. The architecture of decoder 105 is determined in accordance with principles of the invention under the control of bandwidth and architecture control unit 145. A resulting decompressed data output from decoder 105, in the form of single or dual decompressed bitstreams, is suitable for encoding as an NTSC format signal and for subsequent display.

Considering the dynamically configurable architecture of FIG. 1 in detail, an input video datastream is compressed and allocated between a base SDTV data layer and an enhancement HDTV layer by encoder 100. Bandwidth and architecture control unit 120 configures the encoder 100 architecture to appropriately allocate data between the HDTV and SDTV output layers from units 125 and 135 respectively. The appropriate data allocation depends on a number of system factors including bandwidth, system output data rate constraints, the data rate and picture resolution (number of pixels per image) of the input video data, and the picture quality and resolution (number of pixels per image) required at each layer. In the described system, the image resolution between input and output of both encoder 100 and decoder 105 is varied by changing the number of pixels per image as described in greater detail later.

The data allocation and encoding strategy is derived by determining the minimum number of bits per unit time required to represent the video input sequence at the output of encoder 100 for a specified distortion. This is the Rate Distortion Function for encoder 100. The Rate Distortion Function is evaluated, assuming the input sequence is a Gaussian distribution source signal of mean $\mu$ and standard deviation $\sigma$. Further, applying a squared-error criterion to the Rate Distortion Function, R, of such a Gaussian input sequence, in accordance with the theory presented in section 13.3.2 of *"Elements of Information Theory"* by T. M. Cover and J. A. Thomas, published by J. Wiley & Sons, 1991, gives, $$R = \frac{1}{2}\max\left(0, \frac{1}{2}\log_2\left(\frac{\sigma^2}{D}\right)\right), \text{ (bits per second)}$$

$$= \frac{1}{2}\log_2\left(\frac{\sigma^2}{D}\right) \text{ if } 0 \le D \le \sigma^2$$

or,

=0 if $D > \sigma^2$.

Therefore, the Distortion Rate Function, D, is given by, $$D = \sigma^2 2^{-2R}$$

which, when represented as a Peak Signal to Noise Ratio (PSNR), is $$D_{PSNR} = 10\log\left(\frac{255^2}{\sigma^2}\right) + 20\log(2 * R)$$

Figure 2:
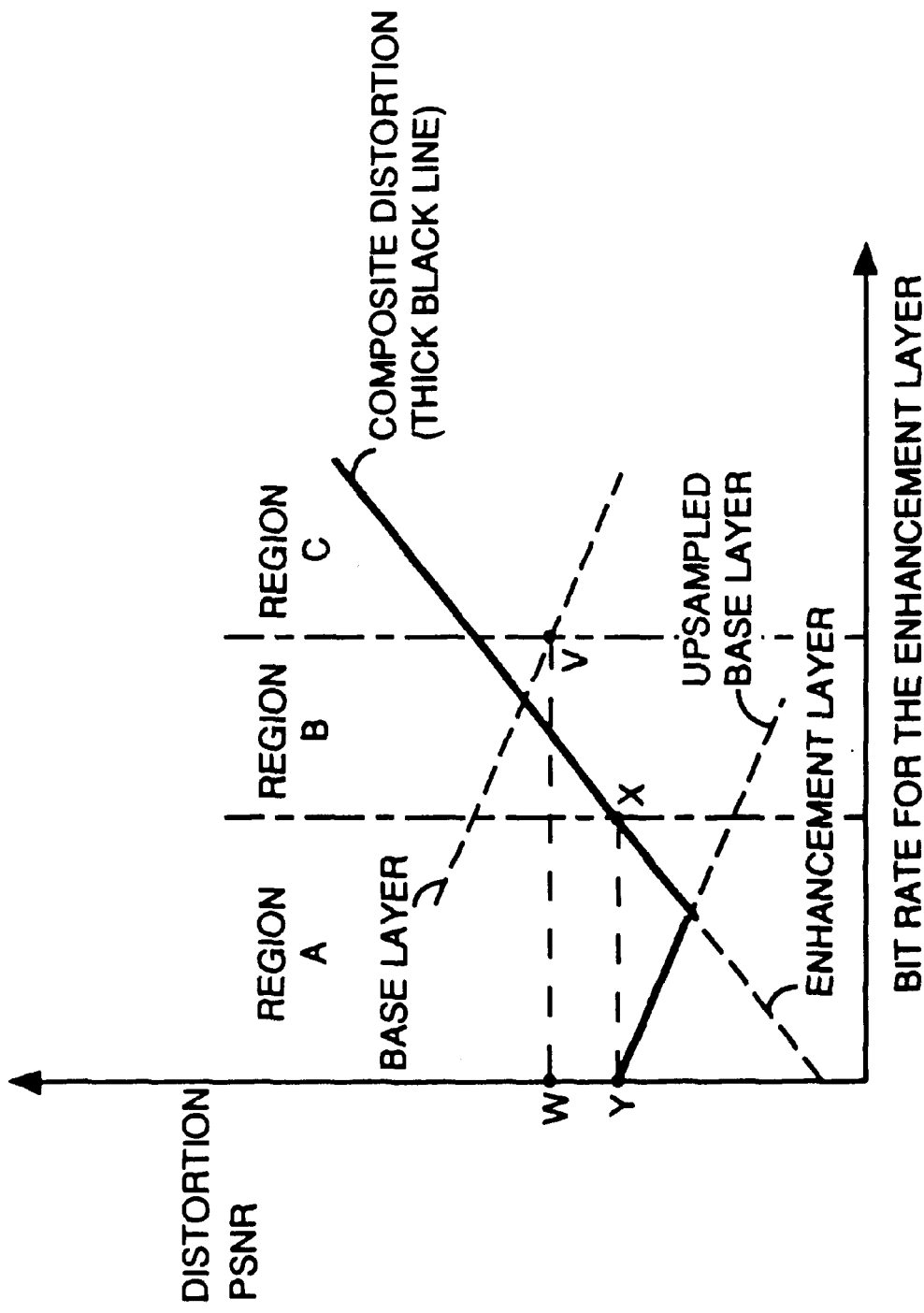
FIG. 2 depicts an exemplary graph of Peak Signal to Noise Ratio (PSNR) plotted against Bit Rate that indicates different coding strategy regions, according to the invention.

FIG. 2 is a graphical representation of Distortion Peak Signal to Noise Ratio $D_{PSNR}$ in decibels (dB), plotted against the Bit Rate of an Enhancement layer (bits per second) for a two layer spatial encoded system. Curves are plotted for a base layer distortion function, an enhancement layer distortion function, and a distortion function for an exemplary upsampled base layer for a 1080 line interpolation of a 720 line picture. The base layer and upsampled base layer curves have a negative slope because as the bit rate of the Enhancement layer increases, the base layer bit rate decreases. The composite distortion curve for the 2 layer system is shown by the thick black line of FIG. 2. This composite Distortion curve is a linearized approximation to the minimum Distortion obtainable for the 2 layer system employing an upsampled base layer.

An encoding and decoding strategy is derived from the two layer system results depicted in FIG. 2. In particular, three regions A, B and C are identified in which advantage can be gained by adopting different encoding and decoding approaches. The boundaries of these regions may vary depending on the system bandwidth, system output data rate constraints, the data rate and picture resolution of the input video data and the picture quality and resolution required at each layer. The regions are identified as follows.

Region A

In region A there is insufficient allocable bandwidth to achieve the required picture quality using either two layer encoding or a single high resolution layer encoding. In this region the video quality of a decoded upsampled base layer equals or exceeds the quality of a decoded picture derived from combined base layer and enhancement layer data. This region is bounded at its upper end at a point X on the enhancement layer curve that gives a picture quality ($D_{PSNR}$ value) equivalent to that of the upsampled base layer curve at the zero Bit Rate Enhancement layer point Y.

In region A there is an advantage in allocating the full available system bandwidth to the encoding and compression of a single layer (the base layer) at a reduced spatial resolution with a reduced number of pixels per image. This strategy may be implemented in various ways. One way, for example, is to downsample an input datastream to provide a single base layer (SDTV) for transmission, and then to decode the corresponding received base layer to provide an SDTV decoded output upon reception. A higher resolution HDTV decoded output may be produced at a receiver in addition to the SDTV decoded output by upsampling (oversampling) the decoded SDTV output. The advantage of this strategy arises because scarce bandwidth is more efficiently used when it is allocated to encode a lower resolution single layer bitstream than when it is used to encode either two layers or a single high resolution layer. This is because these latter approaches typically incur greater encoding overhead associated with required additional error protection and data management code, for example. The region A type of situation may occur, for example, when the total available system bandwidth is insufficient to support full resolution encoding. The advantage of the region A encoding approach may also arise in other situations, for example, when an input datastream to be encoded contains significant non-translational motion. Then, region A spatial down and up sampling may provide better picture quality in a bandwidth constrained system than can be provided by motion compensated prediction encoding. This is because of the overhead associated with such motion compensation. The region A operation is discussed in greater detail in connection with FIG. 5.

Region B

In region B, there is sufficient system bandwidth to meet the required output picture quality using a two layer encoding strategy. In this region, the available system bandwidth is allocated between layers so that the quality requirements of both the decoded high and low resolution outputs are met. This region lies between region A and region C.

In region B, the system bandwidth is allocated in accordance with picture quality requirements between high resolution and low resolution signal output layers. The two output layers may be encoded for transmission in various ways. One way, for example, is to downsample and encode the high resolution input datastream to provide a low resolution (SDTV) layer for transmission, and to decode this low resolution layer when received to provide a low resolution SDTV signal. The high resolution (HDTV) enhancement layer to be transmitted may be derived from a combination of an upsampled version of the encoded SDTV layer and previous frames of the encoded HDTV layer. The HDTV decoded output may be derived from a combination of an upsampled version of the decoded SDTV output and the received encoded HDTV layer. This operation is discussed in greater detail in connection with FIG. 6.

Region C

In region C, the required picture quality cannot be achieved by allocating the system bandwidth either to encode two layers or to encode a single (low resolution) layer. In this region, a high quality output video signal may be achieved, given the system bandwidth constraint, by encoding a single high resolution layer. This region is bounded by a point V on the enhancement layer curve that provides the level of picture quality required as a minimum for the base layer alone (equal to $D_{PSNR}$ value W of FIG. 2).

In region C there is an advantage in allocating the full system bandwidth to the encoding and compression of a single layer (the enhancement layer) at full spatial resolution with a full number of pixels per image. This strategy may be implemented in various ways. One way, for example, is to encode the input datastream at full spatial resolution as a single high resolution enhancement (HDTV) layer for transmission, and to decode the corresponding received enhancement layer to provide the high resolution HDTV output. At a receiver, a low resolution (SDTV) output may be derived from the received high resolution signal by downsampling in the compressed or decompressed domain as described later. The advantage of this region C strategy arises because, given the required output picture quality level, the available bandwidth is more efficiently used when it is allocated to encode a single high resolution layer rather than when it is used to encode two layers for transmission. This is because two layer encoding requires additional error protection and data management overhead information. This region C operation is discussed in greater detail in connection with FIG. 7.

The three regions (A, B and C) identified for the 2 layer system of FIG. 2 may not all be present in every 2 layer system. For example, only one or two regions may be identified depending on the system bandwidth, system data rate constraints, and the picture quality and resolution required at each layer. Conversely, in systems involving more than two layers, more than three regions may be identified in accordance with the principles of the invention. However, irrespective of the number of data regions identifiable in a system, adequate decoded picture quality may be achieved using encoding and decoding architectures configurable for only a limited number of the identifiable regions.

The different encoding and decoding strategies associated with regions A, B and C are implemented in the dynamically configurable architecture of FIG. 1. In encoder 100, the appropriate strategy and architecture for allocating data between the HDTV and SDTV output layers is determined by control unit 120. Control unit 120, e.g. including a microprocessor, configures the architecture of encoder 100 using the process shown in the flowchart of FIG. 3. Control unit 120 first identifies the region type of the input data in step 315 of FIG. 3 following the start at step 310. The region type is determined in accordance with the previously discussed principles based on factors including the available system bandwidth, the data rate of the input datastream and the picture quality required of each decompressed output layer. These factors may be pre-programmed and indicated by data held in memory within control unit 120 or the factors may be determined from inputs to control unit 120. For example, the data rate may be sensed directly from the input datastream. Also, externally sourced inputs may originate from operator selection, for instance, and be input to control unit 120 via a computer interface, for example. In one implementation, for example, control unit 120 may derive input data rate threshold values establishing the boundaries between regions A, B and C based on the preprogrammed values indicating system bandwidth and required picture quality of each decompressed output layer. Then, control unit 120 adopts the appropriate region A, B or C encoding strategy based on the data rate of the input datastream reaching particular thresholds. Alternatively, the input data rate threshold values may themselves be preprogrammed within unit 120.

Figure 3:
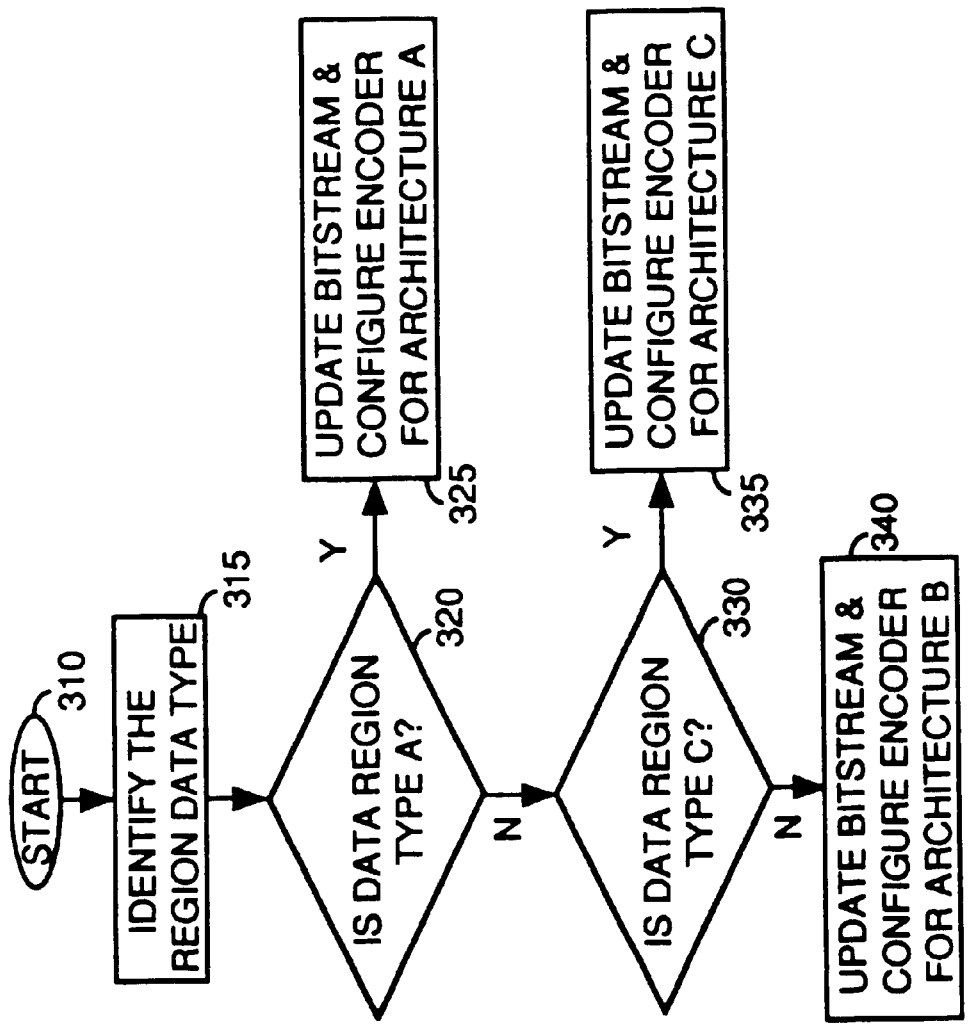
FIG. 3 presents a flowchart of a control function used for determining the FIG. 1 architecture, according to the invention.
Figure 10:
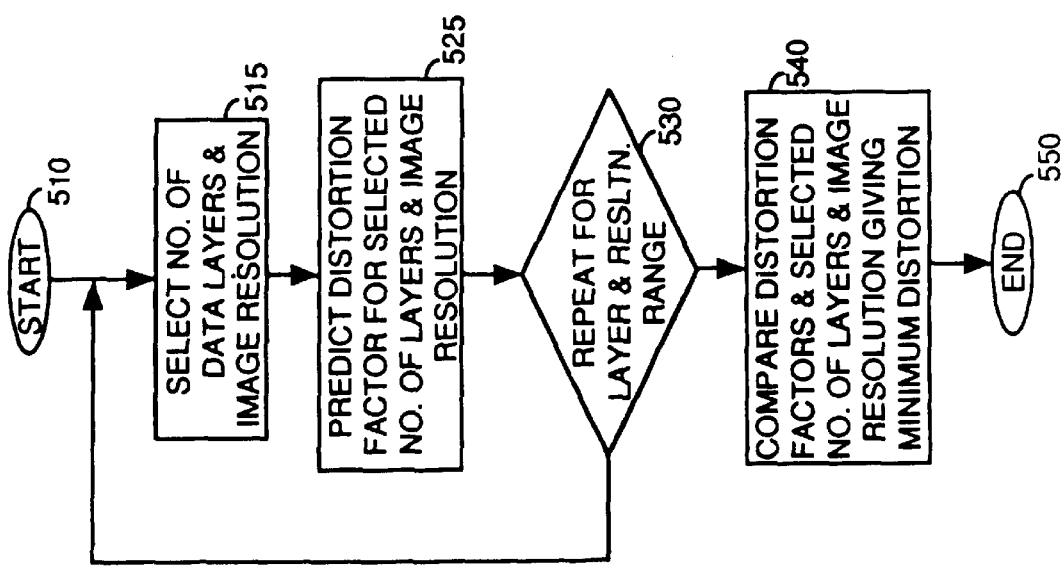
FIG. 10 presents a flowchart of a method for identifying the region type of the input data, according to the invention.

The region type of the input data is identified in step 315 of FIG. 3 using the method shown in the flowchart of FIG. 10. In step 515 of FIG. 10, following the start at step 510, a single hierarchical layer and 1080 line image resolution is initially selected for encoding the data in the coding region. The predicted Distortion factor for the input data when it is encoded as a single layer for transmission with 1080 line resolution is computed in step 525. Step 530 directs that steps 515 and 525 are repeated to compute the Distortion factors for a single layer encoding implementation with 720 line resolution. Also, step 530 directs that steps 515 and 525 are further repeated to compute the Distortion factors for a two layer encoding implementation with both 720 and 1080 line resolutions. The resultant Distortion factors are compared and the image resolution and number of hierarchical layers used for encoding are determined in step 540. The selection process ends at step 550. The number of layers and image resolution are selected in step 540 to give the minimum Distortion factor. This layer and resolution selection process implements the coding region identification function of step 315 (FIG. 3). It should be noted that this method of partitioning encoded input data is also useable for a variety of applications in which data is to be prepared for transmission and is not restricted to image processing. For example, the process may be used for telephony, satellite or terrestrial communication including microwave and fibre-optic communication. Further, this process can encompass other types of data and the partitioning of data into other types of data segments or data packets, not just hierarchical layers of encoded data. The process may also encompass different numbers of data segments and data resolution not just the two layers and the two data resolutions described with respect to the preferred embodiment.

If region A is selected, step 320 (FIG. 3) directs that step 325 is performed and encoder 100 is configured for a type A architecture. In addition, formatter 110 encodes the transmitted bitstream to indicate the region type of the data and the appropriate decoding architecture using information provided by control unit 120. Decoder 105 is compatibly configured to decode the transmitted region A type data in response to the encoded architecture information. If the data is region C type, step 330 directs that step 335 is performed. Step 335 provides that encoder 100 is configured for a region C architecture, and the transmitted bitstream is updated to indicate the data and decoding architecture type in the manner described for region A. If the data is not region C type, step 330 directs that step 340 is performed. Step 340 provides that encoder 100 is configured for a region type B architecture and the transmitted bitstream is updated to indicate the data and decoding architecture type in the manner described for region A.

Control unit 120 configures encoder 100 via a Configuration signal C1 that is provided to each of the constituent elements of encoder 100. Control unit 120 updates the configuration of encoder 100 for individual input data packets where each data packet consists of sequences of code words and represents a group of pictures e.g. a Group of Pictures in accordance with the MPEG standard. However, control unit 120 may update the encoder 100 configuration for different data packet lengths as appropriate for a particular system. For example, the configuration may be performed at power-on, for each picture, for each picture stream (e.g. program), for each pixel block (e.g. macroblock), or at variable time intervals.

In region A operating mode, control unit 120 disables, via the Configuration signal, both HDTV compressor 125 and 2:3 upsampler 130. In the resulting configuration of encoder 100 a single SDTV output layer is provided to formatter 110 by unit 135 of unit 100 for transmission. This configuration is shown and discussed in connection with FIG. 5. Continuing with FIG. 1, to produce the SDTV layer output, 3:2 downsampler 140 reduces the spatial resolution of the 1080 line resolution input datastream by a factor of 2/3 to provide a 720 line output. This may be achieved by a variety of known methods including, for example, simply discarding every third line or preferably by performing an interpolation and averaging process to provide two interpolated lines for every three original lines. The 720 line output from downsampler 140 is compressed by SDTV compressor 135 to provide SDTV layer compressed data to formatter 110. The compression performed by unit 135 employs a temporal prediction process that uses prior SDTV layer frames stored within encoder 135. Such a compression process, involving temporal prediction and Discrete Cosine Transform (DCT) compression, is known and described, for example, in chapter 3 of the Grand Alliance HDTV System Specification of Apr. 14, 1994, published by the National Association of Broadcasters (NAB) Office of Science and Technology in their 1994 Proceedings of the 48th annual conference.

The resultant SDTV bitstream is formed into data packets including identification headers and architecture information by formatter 110. The architecture information is provided by control unit 120 and is encoded by formatter 110 into the transmitted bitstream using the "Hierarchy Descriptor" described in sections 2.6.6 and 2.6.7, of the MPEG image encoding systems standard (ISO/IEC 13818-1, Jun. 10th 1994). The architecture information is subsequently used by decoder 105 to compatibly configure decoder 105 for the appropriate decoding mode (e.g. region A, B or C mode). The configuration of decoder 105, like encoder 100, is updated for each transmitted data packet. A data packet contains a group of pictures in this preferred embodiment.

Although using the MPEG "Hierarchy Descriptor" is the preferred method of ensuring encoder 100 and decoder 105 are compatibly configured, other methods are possible. The architecture information may, for example, be encoded in MPEG syntax in the "User Data" field defined in section 6.2.2.2.2, of the MPEG standard. Alternatively, decoder 105 may deduce the appropriate decoding mode from the bit rate of the encoded received data stream determined from the bit rate field of the sequence header per section 6.2.2.1 of the MPEG standard. The decoder may use this bit rate information together with pre-programmed data detailing the bandwidth and video quality requirements of the decoded output to deduce the appropriate decoding mode in accordance with the previously described principles of the invention. The decoding mode may be changed, for example, when the received bit rate reaches pre-programmed thresholds.

Figure 4:
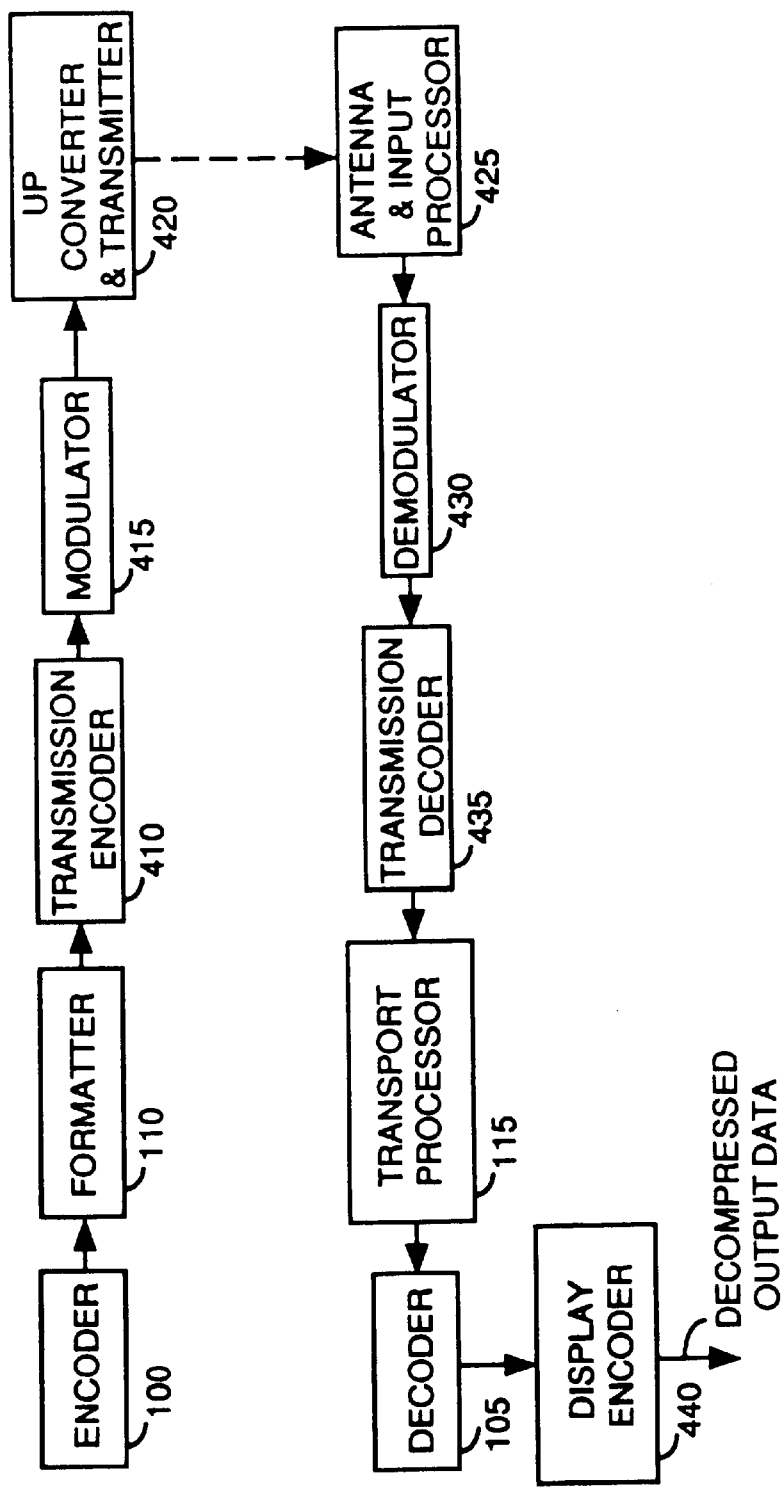
FIG. 4 shows the encoding and decoding system of FIG. 1 in the context of an MPEG compatible encoding and decoding system.

The formatted compressed datastream output from unit 110 is conveyed over a transmission channel before being input to transport processor 115. FIG. 4 shows an overall system including the elements of FIG. 1 as well as transmission and reception elements 410–435. These transmission and reception elements are known and described, for example, in the reference text, *Digital Communication*, Lee and Messerschmidt (Kluwer Academic Press, Boston, Mass., USA, 1988). Transmission encoder 410 encodes the formatted output from unit 110 (FIGS. 1 and 4) for transmission. Encoder 410 typically sequentially scrambles, error encodes and interleaves the formatted data to condition the data for transmission prior to modulation by modulator 415. Modulator 415 then modulates a carrier frequency with the output of encoder 410 in a particular modulation format e.g. Quadrature Amplitude Modulation (QAM). The resultant modulated carrier output from modulator 415 is then frequency shifted and transmitted by up-converter and transmitter 420 which may be, for example, a local area broadcast transmitter. It should be noted that, although described as a single channel transmission system, the bitstream information may equally well be transmitted in a multiple channel transmission system, e.g. where a channel is allocated to each bitstream layer.

The transmitted signal is received and processed by antenna and input processor 425 at a receiver. Unit 425 typically includes a radio frequency (RF) tuner and intermediate frequency (IF) mixer and amplification stages for down-converting the received input signal to a lower frequency band suitable for further processing. The output from unit 425 is demodulated by unit 430, which tracks the carrier frequency and recovers the transmitted data as well as associated timing data (e.g. a clock frequency). Transmission decoder 435 performs the inverse of the operations performed by encoder 410. Decoder 435 sequentially deinterleaves, decodes and descrambles the demodulated data output from unit 430 using the timing data derived by unit 430. Additional information concerning these functions is found, for example, in the aforementioned Lee and Messerschmidt text.

Transport processor 115 (FIGS. 1 and 4) extracts synchronization and error indication information from the compressed data output from unit 435. This information is used in the subsequent decompression performed by decoder 105 of the compressed video data output from processor 115. Processor 115 also extracts decoding architecture information from the MPEG Hierarchy Descriptor field within the compressed data from unit 435. This architecture information is provided to decoder bandwidth and architecture control unit 145 (FIG. 1). Unit 145 uses this information to compatibly configure decoder 105 for the appropriate decoding mode (e.g. region A, B or C mode). Control unit 145 configures decoder 105 via a second Configuration signal C2 that is provided to each constituent element of decoder 105.

In region A mode, control unit 145 of FIG. 1 disables, via the second Configuration signal, both HDTV decompressor 150 and adaptation unit 165. In the resulting configuration of decoder 105, the SDTV layer compressed video output from processor 115 is decompressed by SDTV decompressor 160 to provide a decompressed 720 line resolution SDTV output sequence. The decompression process is known and defined in the previously mentioned MPEG standard. In addition, upsampler 155 oversamples the 720 line resolution SDTV output by a factor of 3/2 to provide a 1080 line resolution HDTV decompressed output. This may be achieved by a variety of known methods including, for example, interpolation and averaging to provide three interpolated lines for every two original lines. The 1080 line resolution decompressed output from upsampler 160 is selected, via multiplexer 180 in response to the second Configuration signal, as the HDTV decompressed output sequence. The resulting decompressed HDTV and SDTV data outputs from decoder 105 are suitable for encoding as an NTSC format signal by unit 440 of FIG. 4, for example, and for subsequent display.

Figure 5:
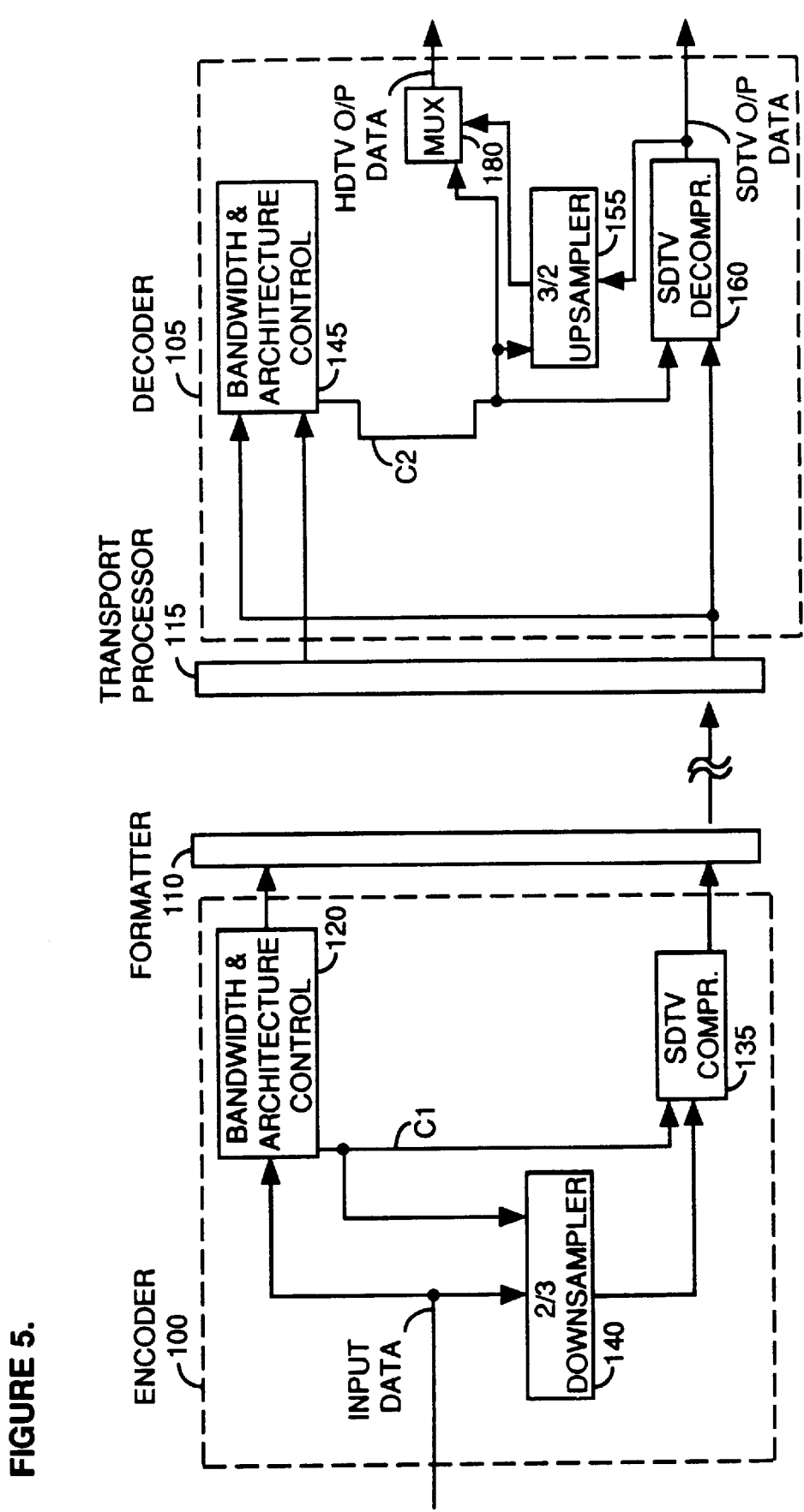
FIG. 5 depicts encoder and decoder architecture, according to the invention, for region A type encoding and decoding.

FIG. 5 shows the encoder and decoder apparatus of FIG. 1 configured for region A type encoding and decoding. The functions of the elements shown are as previously described. Upsampler 130 and HDTV compressor 125, shown in encoder 100 of FIG. 1, are absent in FIG. 5 since these elements are disabled in region A mode as previously described. Similarly, HDTV decompressor 150 and adaptation unit 165, shown in decoder 105 of FIG. 1, are absent in FIG. 5 since these elements are disabled in region A mode also as previously described.

If the input data in FIG. 1 is region B type, control unit 120 configures encoder 100 for a region B architecture. This is done using the Configuration signal in a manner similar to that previously described for region A. However, in region B, encoder 100 compresses both high resolution and low resolution output layers for transmission, in contrast to the single low resolution output compressed for region A. This configuration is shown and discussed in connection with FIG. 6. Continuing with FIG. 1, control unit 120 allocates the system bandwidth between the high resolution and low resolution output layers by configuring encoder 100 to compress enhancement data as a high resolution HDTV output layer in addition to a low resolution SDTV output. This HDTV layer provides picture refinement data to enable decoder 105 to produce a 1080 line resolution picture output from the 720 line resolution SDTV layer.

The SDTV layer output in region B is produced in the same way as described for region A. The 720 line output from downsampler 140 is compressed by SDTV compressor 135 to provide SDTV layer compressed data to formatter 110. However, in region B, the high resolution HDTV enhancement layer for transmission is derived by HDTV compressor 125. Compressor 125 derives the HDTV output by combining and compressing an upsampled decompressed version of the SDTV layer produced by upsampler/decompressor 130 and previous frames of the HDTV layer stored within compressor 125. Such a combination and compression process involving temporal prediction performed by compressor 125 is known and contemplated, for example, in the spatial scalability section (section 7.7) of the MPEG standard. The resulting HDTV and SDTV compressed outputs from encoder 100 are provided to formatter 110.

The HDTV and SDTV bitstreams from encoder 100 are formed by formatter 110 into data packets including identification headers and architecture information in the "Hierarchy Descriptor" field. As described for region A, the formatted data from unit 110 is conveyed to transport processor 115 which provides the architecture information to decompressor control unit 145 for configuring decoder 105 (here for region B).

At the receiver, in region B mode, control unit 145 disables adaptation unit 165 using the second Configuration signal. In the resulting configuration of decoder 105, the compressed SDTV output from processor 115 is decompressed by unit 160 to give a 720 line resolution SDTV output, as in region A. HDTV decompressor 150 derives a decompressed 1080 line resolution HDTV output by combining and decompressing an upsampled version of this decoded SDTV output produced by upsampler 155 and previous frames of the HDTV layer stored within decompressor 150. The process of combining the upsampled and stored data and forming a decompressed output as performed by decompressor 150 is known and described, for example, in the spatial scalability section (section 7.7) of the MPEG standard. The 1080 line high resolution decompressed output from decompressor 150 is selected as the HDTV decompressed output, via multiplexer 180, in response to the second Configuration signal. The resulting decompressed HDTV and SDTV data outputs from decoder 105 are suitable for further processing and subsequent display as previously described.

Figure 6:
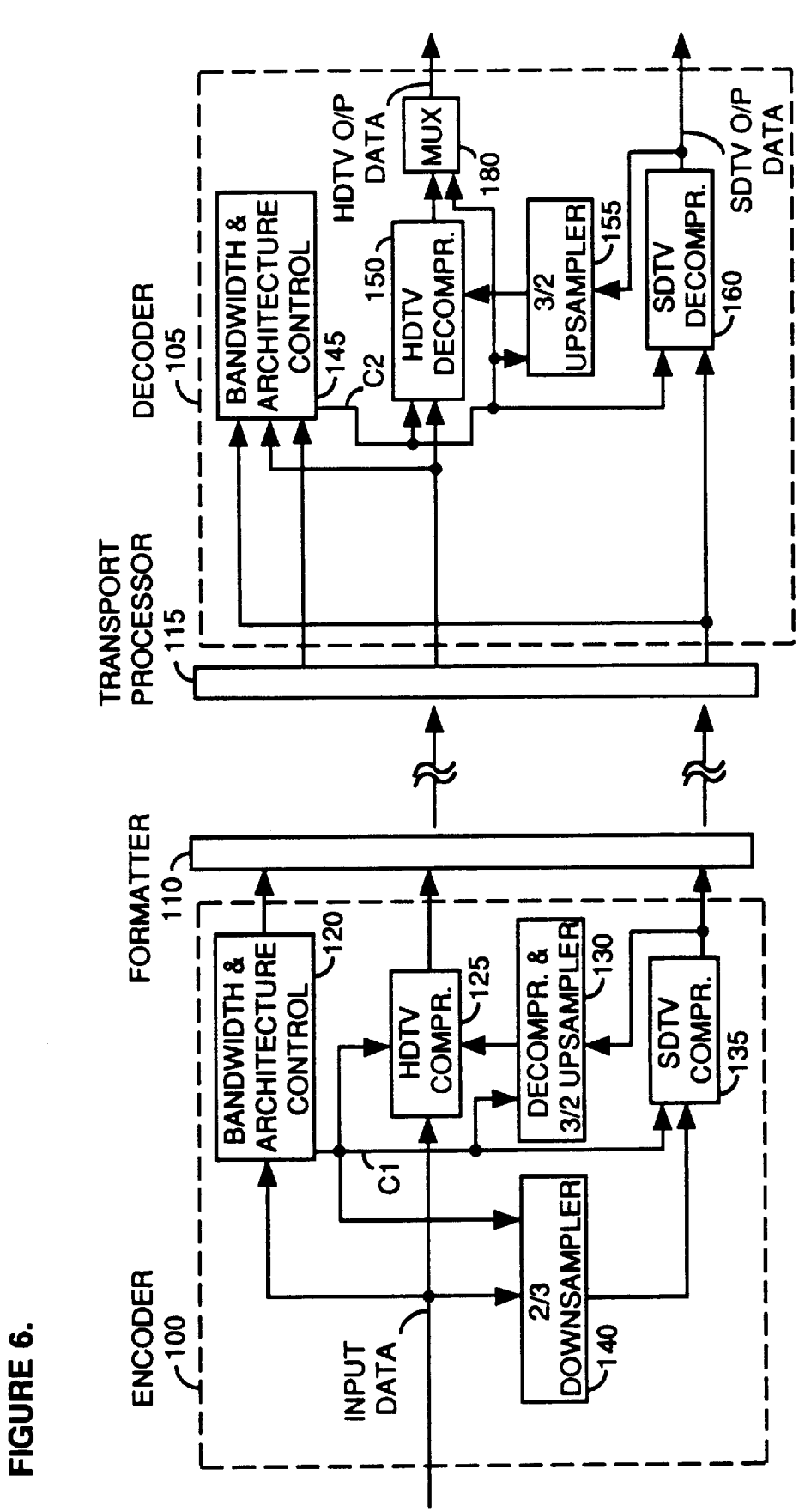
FIG. 6 shows encoder and decoder architecture, according to the invention, for region B type encoding and decoding.

FIG. 6 shows the encoder and decoder apparatus of FIG. 1 configured for region B type encoding and decoding. The functions of the elements shown are as previously described. Adaptation unit 165, shown in decoder 105 of FIG. 1, is absent in FIG. 6 since this element is disabled in region B mode also as previously described.

If the input data in FIG. 1 is region C type, control unit 120 configures encoder 100 for a region C architecture. This is done using the Configuration signal in a manner similar to that previously described for region A. However, in region C, encoder 100 encodes a single high resolution output rather than a low resolution output as for region A or two outputs as for region B. Control unit 120 allocates the full system bandwidth, if necessary, to encode a high resolution output and configures unit 100, via the Configuration signal, to encode the enhancement layer at a full spatial (1080 line) HDTV resolution.

In region C mode, control unit 120 disables downsampler 140, SDTV compressor 135 and upsampler 130, via the Configuration signal. In the resulting configuration of encoder 100 the input sequence is compressed by HDTV compressor 125 using the full system bandwidth as required to provide a 1080 line resolution HDTV output to formatter 110. This configuration is shown and discussed in connection with FIG. 7. Continuing with FIG. 1, compressor 125 derives the HDTV output using previous frames of the HDTV layer stored within compressor 125. The compression process performed by compressor 125 in region C is like that described for regions A and B and is also known.

The HDTV bitstream from unit 100 is formed by formatter 110 into data packets including identification headers and architecture information in the "Hierarchy Descriptor" field. As described for region A, the formatted data from unit 110 is conveyed to transport processor 115, which provides the architecture information to decoder control unit 145 for configuring decoder 105 (here for region C).

At the receiver, in region C mode, control unit 145 disables upsampler 155 using the second Configuration signal. In the resulting configuration of decoder 105, the compressed HDTV output from processor 115 is decompressed by unit 150 to give a 1080 line high resolution HDTV output. This 1080 line decompressed output from decompressor 150 is selected as the HDTV decoded output of decoder 105, via multiplexer 180, in response to the second Configuration signal. In addition, the compressed HDTV output from processor 115 is adapted to meet the input requirements of SDTV decompressor 160 by adaptation unit 165. This is done by reducing the spatial resolution of the compressed HDTV output from processor 115 to an effective 720 line resolution in the compressed (frequency) domain. This may be performed, for example, by discarding the higher frequency coefficients of those Discrete Cosine Transform (DCT) coefficients that represent the video information of the compressed HDTV output from processor 115. This process is known and described, for example, in "*Manipulation and Compositing of MC-DCT Compressed Video*" by S. Chang et al, published in the I.E.E.E. Journal of Selected Area in Communications (JSAC), January 1995. The spatially reduced compressed output from adaptation unit 165 is decompressed by unit 160 to give a 720 line resolution SDTV output. The decompression processes performed by units 160 and 150 are like those described for region A and similarly known. The resulting decoded HDTV and SDTV data outputs from decoder 105 are suitable for further processing and subsequent display as previously described.

Figure 7:
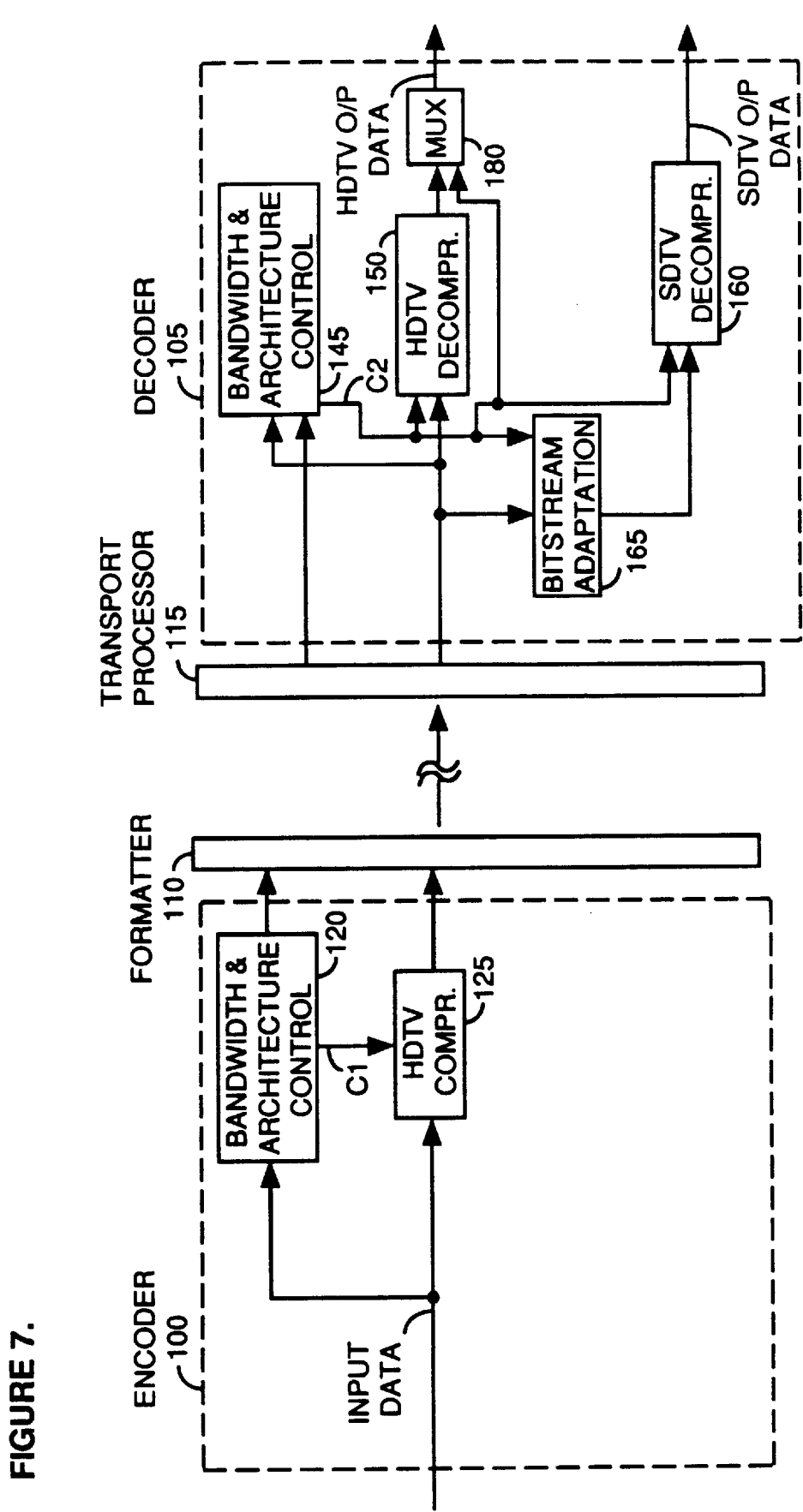
FIG. 7 shows encoder and decoder architecture, according to the invention, for region C type encoding and decoding.

FIG. 7 shows the encoder and decoder apparatus of FIG. 1 configured for region C type encoding and decoding. The functions of the elements shown are as previously described. Downsampler 140, SDTV compressor 135 and upsampler 130, shown in encoder 100 of FIG. 1, are absent in FIG. 7 since these elements are disabled in region C mode as previously described. Similarly, upsampler 155, shown in decoder 105 of FIG. 1, is absent in FIG. 7 since this element is disabled in region C mode.

Figure 8:
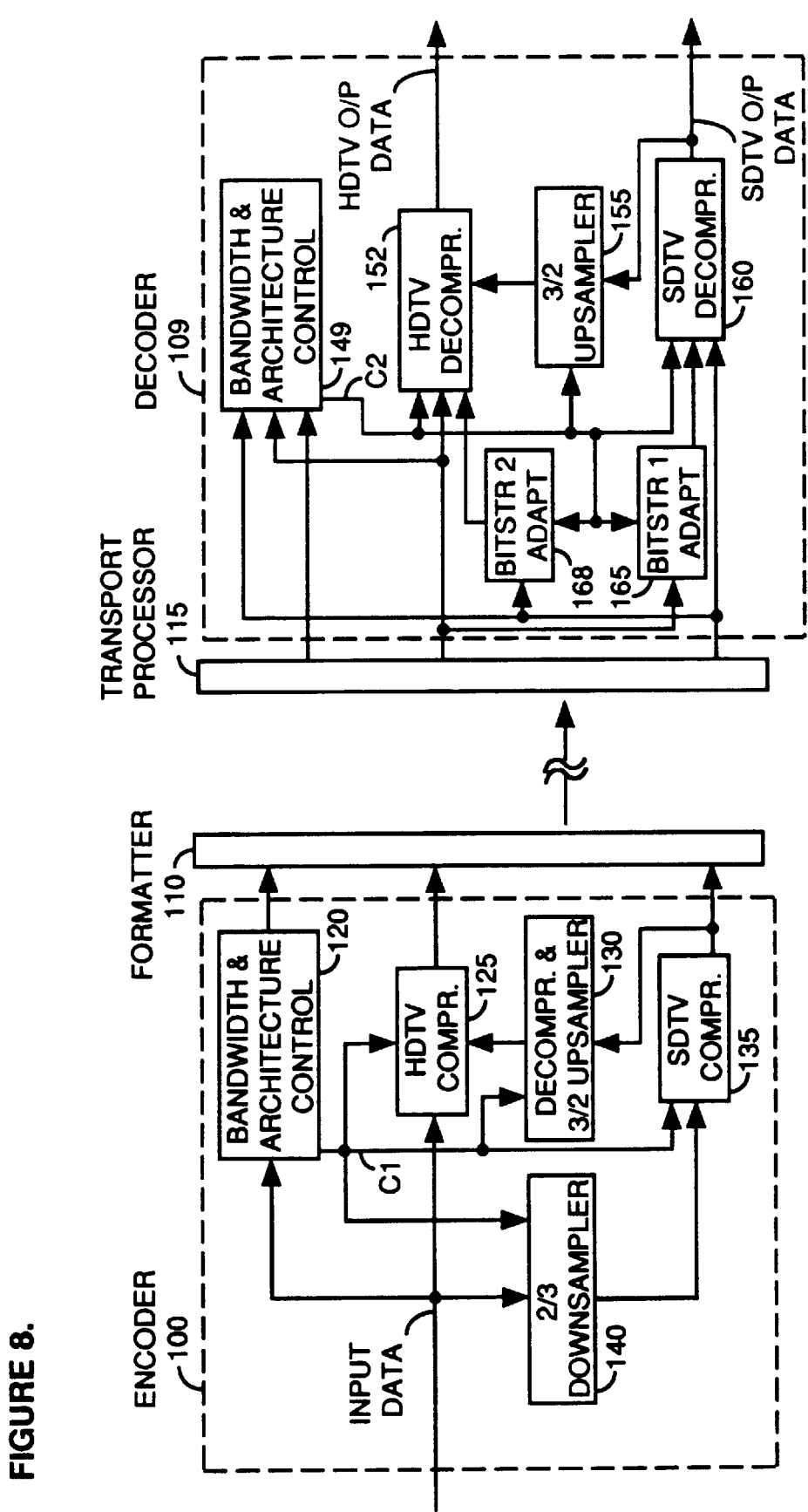
FIG. 8 is a variation of FIG. 1 with an additional architecture configuration for region A decoding, according to the invention.

FIG. 8 is a variation of FIG. 1 and shows an additional architecture configuration for region A decoding. The functions performed by encoder 100, formatter 110 and transport processor 115 of FIG. 8 are as described for FIG. 1. In addition, the functions of decoder 109 of FIG. 8 are the same as those of decoder 105 of FIG. 1 except that in region A decoding, the 1080 line resolution HDTV decompressed output is provided in a different manner.

In region A mode, decoder control unit 149 of FIG. 8 disables, via the second Configuration signal, both upsampler 155 and adaptation unit 165. In the resulting configuration of decoder 109 the SDTV layer compressed video output from processor 115 is decompressed by SDTV decompressor 160 to provide the SDTV output of decoder 109. This is performed in the same manner as described for FIG. 1. However, the HDTV decompressed output from decoder 109 is produced by upsampling the SDTV layer in the frequency domain in contrast to the time domain sampling performed in decoder 105 of FIG. 1. The compressed output from processor 115 in FIG. 8 is upsampled in the compressed (frequency) domain by adaptation unit 168 (not present in FIG. 1). This may be performed, for example, by "zero padding" the higher order Discrete Cosine Transform (DCT) frequency coefficients that represent the video information in the compressed SDTV output from processor 115. In effect, selected higher order DCT coefficients are assigned zero values. The theory behind this process is known and described, for example, in the previously mentioned "Manipulation and Compositing of MC-*DCT Compressed Video*" by S. Chang et al, published in the I.E.E.E. Journal of Selected Area in Communications (JSAC), January 1995. The resultant upsampled output from adaptation unit 168 is decompressed by HDTV decompressor 152 to provide the HDTV output from decoder 109. The resulting decompressed HDTV and SDTV data outputs from decoder 109 are suitable for processing and subsequent display as described in connection with FIG. 1.

Figure 9:
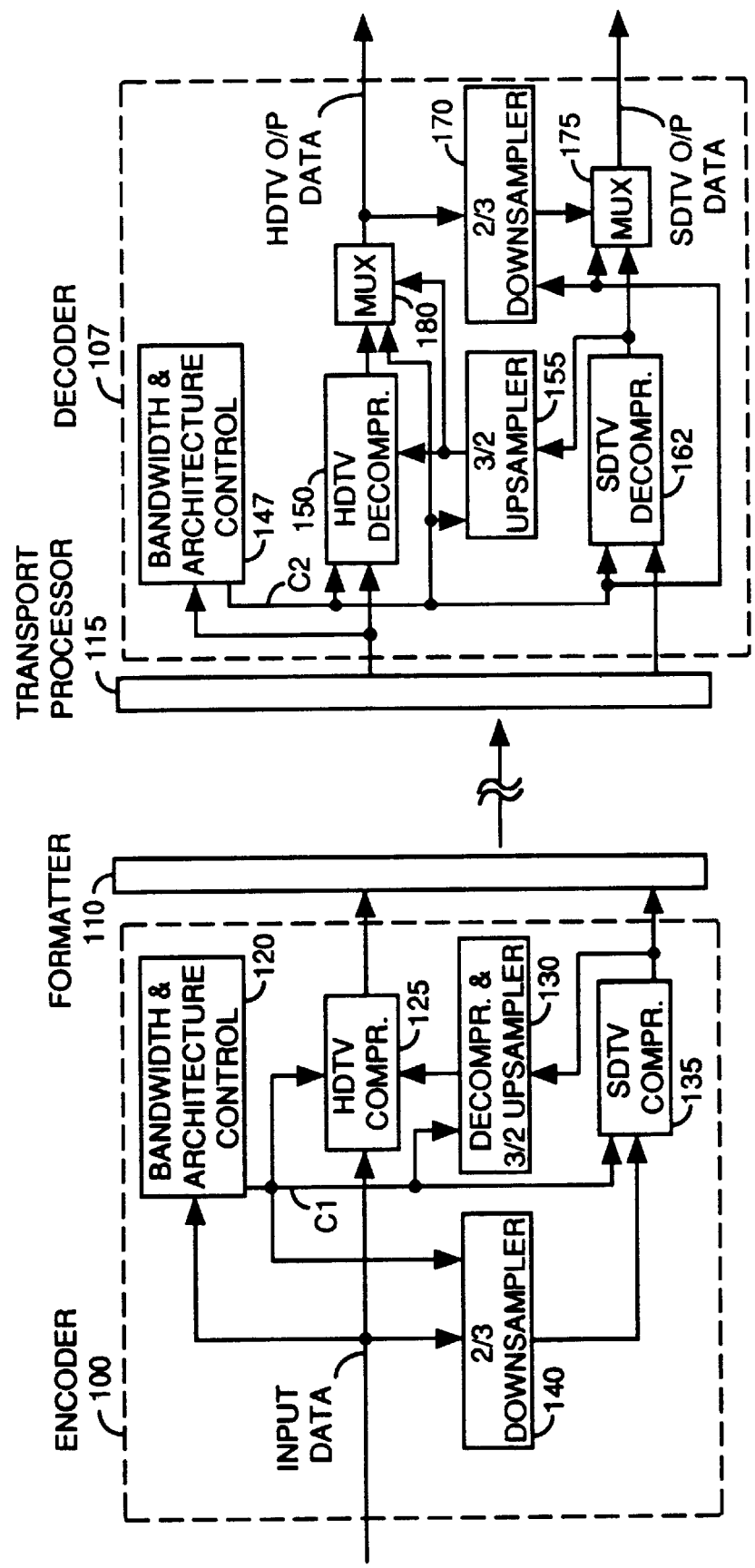
FIG. 9 is a variation of FIG. 1 with an additional architecture configuration for region C decoding, according to the invention.

FIG. 9 is a variation of FIG. 1 and shows an additional architecture configuration for region C decoding. The functions performed by encoder 100, formatter 110 and transport processor 115 of FIG. 9 are as described for FIG. 1. In addition, the functions of decoder 107 of FIG. 9 are the same as those of decoder 105 of FIG. 1 except that in region C decoding, the 720 line resolution SDTV decompressed output is provided in a different manner.

In region C mode, control unit 147 of FIG. 9 disables, via the second Configuration signal, both upsampler 155 and SDTV decompressor 162. In the resulting configuration of decoder 107 the HDTV layer compressed video output from processor 115 is decompressed by HDTV decompressor 150 to provide the HDTV output of decoder 107. This is performed in the same manner as described for FIG. 1. However, the SDTV decompressed output from decoder 107 is produced by downsampling the HDTV layer in the time domain in contrast to the frequency domain sampling performed in decoder 105 of FIG. 1. The decompressed HDTV output from multiplexer 180 in FIG. 9 is downsampled by downsampler 170 (not present in FIG. 1) by a factor of 2/3 to provide a 720 line output. This may be performed by a variety of known methods as discussed with respect to downsampler 140 of encoder 100 in FIG. 1. The 720 line resolution decompressed output from downsampler 170 is selected as the SDTV decoded output of decoder 107, via multiplexer 175 (not present in FIG. 1), in response to the second Configuration signal. The resulting decompressed HDTV and SDTV data outputs from decoder 107 are suitable for processing and subsequent display as described in connection with FIG. 1.

The encoder and decoder architectures discussed with respect to FIGS. 1–9 are not exclusive. Other architectures may be derived for the individual regions (A, B and C) that could accomplish the same goals. Further, the functions of the elements of the various architectures may be implemented in whole or in part within the programmed instructions of a microprocessor.

What is claimed is:

1. A digital signal processing system for adaptively decoding a datastream including image representative input pixel data comprising a sequence of image frames or fields and partitioned into one or more data segments, said system comprising:

a processor for deriving synchronization information from said datastream;

a controller for deriving configuration information from said datastream and providing a control signal representing said configuration information; and a decoder for decoding said input pixel data using said synchronization information, said decoder being adaptively configured to decode, the number of said data segments of said input pixel data in response to said control signal wherein said number of said data segments of said input pixel data is dynamically varied in response to a periodically updated rate distortion computation.

2. A system according to claim 1, wherein said decoder configuration is adaptively varied upon the bit rate of an input datastream reaching predetermined thresholds.

3. A system according to claim 1, wherein said decoder exhibits a first configuration for spatial domain downsampling a number of data segments of image representative data containing a first numbers of pixels per image frame and a second configuration for spatial domain upsampling said number of data segments of image representative data containing a different second number of pixels per image frame.

4. A system according to claim 1, wherein said decoder is dynamically configured to decode said number of said data segments varying in response to a rate distortion computation performed at intervals of at least one of, a) a program duration interval, b) a Group of Picture (GOP) duration interval, c) a frame duration interval, d) a field duration interval and e) a macroblock processing duration interval.

5. A system according to claim 1, wherein said decoder is adaptively configured for one of a plurality of coding regions with boundaries defined by one or more of the following characteristics, (a) processing bandwidth, (b) desired output data rate, and (c) desired image resolution.

6. Apparatus according to claim 1, wherein said decoder is also dynamically configured for decoding input pixel data spatial resolution variable in response to said rate distortion computation.

7. Apparatus according to claim 1, wherein said rate distortion computation provides a measure of the distortion in an image encoded with a particular number of bits per unit time.

8. Apparatus for decoding input data representing compressed images of variable spatial resolution, comprising:

a control network for deriving configuration information from said input data and providing a configuration control signal representing said configuration information; and a decompression network responsive to said input data and to said control signal for decompressing said input data to provide decompressed image data and including an adaptively configurable decoder, wherein said decoder is dynamically configured for decoding input pixel data spatial resolution variable in response to a periodically performed rate distortion computation.

9. Apparatus according to claim 8, wherein said decoder is dynamically configured to decode input pixel data representing images of spatial resolution varying in response to a rate distortion computation performed at intervals of at least one of, a) a program duration interval, b) a Group of Picture (GOP) duration interval, c) a frame duration interval, d) a field duration interval and e) a macroblock processing duration interval.

10. Apparatus according to claim 8, wherein said decoder is configured in, (a) a first configuration for spatial domain downsampling image representative data containing a first number of pixels per image frame to provide decoded image data with a first number of pixels per image frame substantially equal to the number of pixels per image frame of said input data, and (b) a second configuration for spatial domain upsampling image representative data containing a second number of pixels per image frame to provide decoded image data with a second number of pixels per image frame less than the number of pixels per image frame of said input data.

11. In a system including a decoder for adaptively decoding a datastream including image representative input pixel data comprising a sequence of image frames or fields and partitioned into one or more data segments, a method comprising the steps of:

a) deriving synchronization information from said datastream;

b) deriving configuration information from said datastream;

c) generating a control signal representing said configuration information;

d) configuring a decoder to decode the number of said data segments of said input pixel data in response to said control signal wherein said number of said data segments of said input pixel data dynamically varies in response to a periodically performed rate distortion computation; and e) applying said decoder to decode said input pixel data using said synchronization information.

12. A method according to claim 11, wherein said data segments comprise hierarchical data layers.

13. In a system including a decoder for decoding input data representing compressed images of variable spatial resolution, a method comprising the steps of:

a) deriving configuration information from said input data;

b) generating a configuration control signal representing said configuration information;

c) dynamically configuring a decoder for decoding input data spatial resolution variable in response to a periodically performed rate distortion computation; and d) employing said decoder for decoding and decompressing said input data to provide decompressed image data.

14. A method according to claim 13, wherein said configuring step includes configuring said decoder to decode input pixel data representing images of spatial resolution varying in response to a rate distortion computation performed at intervals of at least one of a) a program duration interval, b) a Group of Picture (GOP) duration interval, c) a frame duration interval, d) a field duration interval and e) a macroblock processing duration interval.

15. A method according to claim 13, wherein said configuring step configures said decoder for, in a first configuration, spatial domain downsampling image representative data containing a first number of pixels per image frame to provide decoded image data with a first number of pixels per image frame substantially equal to the number of pixels per image frame of said input data, and in a second configuration, spatial domain upsampling image representative data containing a second number of pixels per image frame to provide decoded image data with a second number of pixels per image frame less than the number of pixels per image frame of said input data.

\* \* \* \* \*